Patented Feb. 2, 1943

2,309,679

UNITED STATES PATENT OFFICE 2,309,679

PROCESS OF PREPARING GUANAMINES

Jack Theo Thurston, Cos Cob, Conn., assignor to American Cyanamid Company, New York, N. Y., a corporation of Maine No Drawing. Application August 30, 1941, Serial No. 409,126

12 Claims. (Cl. 260—248)

This invention relates to an improved process of preparing unsubstituted guanamines and their 4- and 6-N-alkyl substituted derivatives.

Certain simple guanamines such as formoguanamine have been prepared by the reaction of biguanide with an ester of the corresponding acid. When, however, the acid is of higher molecular weight, the reaction speed drops off very rapidly. Thus, for example, good yields at high reaction speed are obtained with formates at room temperatures, the yield drops off very sharply when butyrates are substituted for the formates, and with further longer chains, the speed becomes so low as to be industrially impracticable unless elevated temperatures are used, and even then the speed is not always satisfactory and the higher reaction temperatures result in material decomposition of the biguanide.

I have found that when a metal alkoxide is added to the reaction mixture, the reaction speed is notably accelerated and better yields are obtainable and it is possible to prepare guanamines having long aliphatic chains attached to the 2-carbon atom of the triazine ring, such as for example, stearoguanamine, lauroguanamine, and the like. The metal alkoxide does not appear to have a catalytic effect in the strict sense of the term, that is to say, a small amount of the alkoxide is not sufficient to catalyze the reaction of a relatively large amount of ester and biguanide. Apparently the influence of an alkoxide is primarily chemical because it is normally used in stoichiometrical proportions or approximate, in order to obtain best results. The exact mechanism of the reaction has not been determined and the present invention is not intended to be limited to any theory of action. Although the action is not catalytic, varying amounts of the alkoxide will make progressively increased yields and in some cases satisfactory results may be obtained by using somewhat less than stoichiometric proportions, and hence the invention is not intended to be limited to exact molecular equivalents of the alkoxide.

Various metal alkoxides such as aluminum isopropoxide, sodium methoxide, sodium ethoxide, corresponding alkoxides of potassium, and the like, appear to have the same results. The reaction of biguanide and ester is facilitated by the use of suitable solvents for the biguanide among which the lower monohydric paraffin alcohols are preferred. In such cases it is not necessary to add a metal alkoxide as it is sufficient to introduce the metal into the reaction mixture containing the alcohol, and in the case of aluminum, a small amount of mercuric chloride or iodine and copper are added to facilitate the formation of the alkoxide. Other compounds which decompose in alcohol to yield the metal alkoxides may be used such as sodamide and the like. It is also possible to use the alkali metal themselves or some of their organic derivatives such as sodium hydride and sodium triphenyl methyl in inert solvents, but the alkoxides are preferable and in the case of reactions taking place in alcohol solutions, they are formed in any event.

The present invention will be described in detail in conjunction with the following specific examples which are typical illustrations of the invention.

Example 1

Lauroguanamine

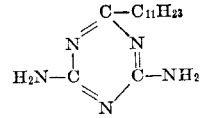

10 parts of biguanide dissolved in 200 parts of ethyl alcohol were mixed with 32 parts of methyl laurate and 2.3 parts of sodium metal dissolved in 50 parts of ethyl alcohol. On standing for a considerable period, lauroguanamine precipitated out, the crude product having a melting point of 115° C. and the yield being about 88%. A similar test was made except that the amount of sodium was reduced to 1.5 parts. The resulting yield dropped to 83% but gave a product with slightly higher degree of purity, the melting point being about 118–119° C. When the amount of sodium was only 0.24 part, the yield was approximately 73.6%, with a melting point of 117–119° C. These results should be compared with a similar test in which no sodium was added. Even after refluxing for 18 hours, the yield obtained in this case was only 54.2%.

Example 2

Stearoguanamine

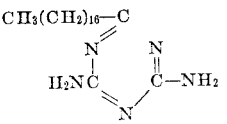

To 150 parts of biguanide dissolved in 1200 parts of methanol was added 298 parts of methyl stearate dissolved in 400 parts of ethyl alcohol and 23 parts of sodium dissolved in 160 parts of methanol. After stirring the reaction mixture for about two hours, the product began to precipitate. However, stirring was continued for several hours. The copious precipitate was filtered and washed with methanol. After concentrating the combined methanol filtrates to about one-third of their original volume, 50 parts of concentrated sulfuric acid dissolved in 150 parts of methanol was added. The precipitated sodium sulfate was filtered from the hot solution, which after cooling, deposited more stearoguanamine. The combined product was then recrystallized from about 1000 parts of hot acetone and the yield of stearoguanamine melting at 112–114° C. was slightly under 65%. A portion of the product was further purified by recrystallization and a melting point of 116–117° C. was finally obtained.

Example 3

α,α-dichlorostearoguanamine

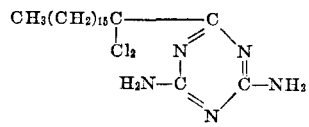

To 25 parts of biguanide dissolved in 160 parts of methanol was added 114 parts of ethyl dichlorstearate and 6 parts of sodium metal dissolved in 80 parts of ethanol. After standing a short time, the product began to precipitate from the solution. The yield of α,α-dichlorostearoguanamine was about 41% of the theoretical.

Example 4

4-aminobenzoguanamine

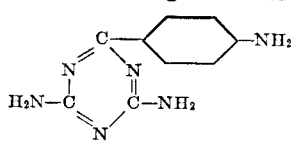

Figty-eight parts of ethyl 4-aminobenzoate were mixed at room temperature with 30.3 parts of biguanide dissolved in 200 parts of methanol, preferably the solid ester was added to the solution of the biguanide. After thoroughly mixing at room temperature, the mixture was allowed to stand until precipitation was complete, which took some ten days. The guanamine was recrystallized from water in the form of small colorless plates, and had a melting point of 206° C. The yield was about 37%.

The reaction was repeated except that a molecular equivalent of sodium methylate was added. This reduced reaction time to three days and increased the yield to 67%.

Example 5

1-phenylpyrazolonyl-3-guanamine

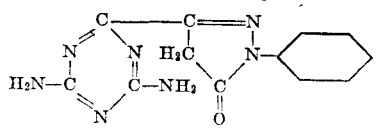

Five parts of biguanide was dissolved with 12 parts of 1-phenylpyrazolone-3-carboxylate in 40 parts of methanol and a molecular equivalent of sodium methylate added. After standing, the guanamine formed but did not precipitate from the solution until the reaction mixture was acidified with acetic acid. The product was then purified by dissolving in a 50/50 mixture of ethanol and the ethyl ether of ethylene glycol followed by dilution with a large amount of water. A tan amorphous solid melting at 261° C. separated from the solution, the yield being about 20%.

Example 6

2-hydroxymethylbenzoguanamine

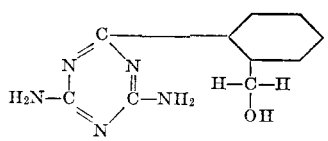

20.2 parts of biguanide were dissolved in 80 parts of methanol and to the filtered solution was added 28.2 parts of phthalide dissolved in 80 parts of methanol, together with the molecular equivalent of sodium methoxide. After standing overnight the guanamine had partially precipitated and within one-half hour after scratching the sides of the reaction flask, there was a voluminous precipitate. The product was recrystallized from water containing a small amount of ammonia and the plate-like needles melted at 218° C., the yield being just under 45%.

Example 7

2-hydroxycinnamoguanamine

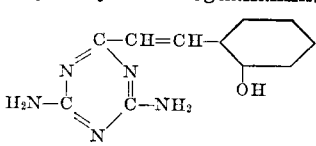

21.2 parts of biguanide were dissolved in 100 parts of methyl alcohol, the solution was filtered, and then a solution of 29.2 parts of coumarine dissolved in 80 parts of methyl alcohol were added. Reaction took place slowly and was speeded up by the addition of a small amount of sodium methoxide. The solution was acidified with acetic acid and evaporated, giving a yellow solid which was boiled with water, filtered, and finally dissolved in the ethyl ether of ethylene glycol. On dilution with an equal volume of naphtha, fine light yellow needles, melting at 296° C., were precipitated. The yield was about 15%.

Example 8

4-N-allylpropicnoguanamine

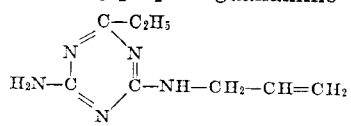

To 38 parts of allylbiguanide dissolved in 200 parts of methanol containing 6.5 parts of sodium metal was added 40.8 parts of ethyl propionate. After standing for about 24 hours, the clear reaction mixture was neutralized with 5% hydrochloric acid and the solvent evaporated. The 4-allylpropionoguanamine was obtained as an oil, but crystallized on standing and cooling in an ice bath. The yield of crude product melting at 83–85° C. was 77%, and after recrystallization from alcohol, the purified material melted at 85–87° C.

Example 9

Oleoguanamine

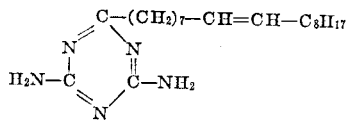

To 10 parts of biguanide dissolved in about 40 parts of methanol were added 44 parts of methyl oleate and 2.3 parts of sodium metal dissolved in 40 parts of methanol. The oleoguanamine began to separate from the solution, after standing a short time, and after filtration, the yield of product was about 88%.

Example 10

Decanoguanamine

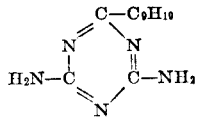

Sixty-nine parts of methyl caprate were dissolved in a filtered solution of 25 parts of biguanide in 160 parts of methanol. 51 parts of aluminum isopropoxide was heated with a mixture of 40 parts of methanol and 75 parts of isopropanol and the slurry was added to the ester solution. The reaction mixture was allowed to stand since crystallization of the guanamine did not occur immediately. The reaction mixture was then poured into about 500 parts of 5% sodium hydroxide and the mixture was warmed to about 75° C. and then allowed to cool. After cooling in ice, the white solid was removed by filtration, washed with dilute sodium hydroxide, and then with water. The crude caproguanamine melting at 117–118° C. was obtained in a yield of 78% and after recrystallization from acetone the melting point was raised to 118–119° C.

Example 11

α-ethylhexanoguanamine

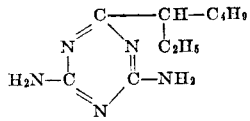

To 66 parts of biguanide dissolved in 400 parts of methanol was added 142 parts of methyl 2-ethylhexanoate and 15 parts of sodium metal dissolved in 80 parts of methanol. This reaction mixture was stirred overnight while the temperature was maintained at about 25° C. The precipitated α-ethylhexanoguanamine was removed by filtration yielding about 85 parts of crude product melting at 103–105° C. The filtrate was concentrated to a small volume and diluted with water which precipitated 28 parts of crude product. Thus the yield of crude α-ethylhexanoguanamine was 82%. After recrystallization from ethyl acetate and drying under vacuum the product melted at 108–109.5° C.

Example 12

4-N-butyl-α-ethylhexanoguanamine

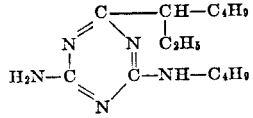

To 31 parts of neutral 1-butylbiguanide sulfate and 28.5 parts of ethyl 2-ethylhexanoate dispersed in 160 parts of ethyl alcohol were added 7.0 parts of metallic sodium dissolved in 80 parts of ethyl alcohol. The reaction mixture was stirred and heated at reflux temperature for about 8 hours. The insoluble sodium sulfate was removed by filtration and the alcohol solution was concentrated to about one-third of its original volume and diluted with about 400 parts of water. After removing the water-insoluble 4-N-butyl-α-ethylhexanoguanamine, it was dried and recrystallized from naphtha (90–125° C.). The yield of a product melting at 131–132° C. was about 30%.

Similar results are obtained when ethyl and amyl biguanides are used, forming the corresponding 4-N-ethyl and 4-N-amyl compounds. The yields are approximately the same.

What I claim is:

1. A method of preparing guanamines included in the group consisting of N-unsubstituted guanamines and N-alkyl substituted guanamines which comprises reacting the corresponding biguanide with an ester of the corresponding acid in the presence of a metal alkoxide.

2. A method of preparing an N-unsubstituted guanamine which comprises reacting biguanide with an ester of the corresponding acid in the presence of a metal alkoxide.

3. A method of preparing an N-alkyl substituted guanamine which comprises reacting an alkyl-substituted biguanide with an ester of the corresponding acid in the presence of a metal alkoxide.

4. A method according to claim 1 in which the metal alkoxide is present in approximately stoichiometrical proportions.

5. A method according to claim 2 in which the metal alkoxide is present in approximately stoichiometrical proportions.

6. A method according to claim 3 in which the metal alkoxide is present in approximately stoichiometrical proportions.

7. A method of preparing lauroguanamine which comprises reacting a biguanide with an ester of lauric acid in the presence of an alkali metal alkoxide.

8. A method according to claim 7 in which the alkoxide is present in approximately stoichiometrical proportions.

9. A method of preparing a guanamine which comprises reacting biguanide and an ester of the corresponding acid in solution in a lower monohydric paraffin alcohol in the presence of a metal alkoxide.

10. A method of preparing N-alkyl substituted guanamines which comprises reacting an alkyl-substituted biguanide and an ester of the corresponding acid in solution in a lower monohydric paraffin alcohol in the presence of a metal alkoxide.

11. A method according to claim 9 in which the alkoxide is present in approximately stoichiometrical proportions.

12. A method according to claim 10 in which the alkoxide is present in approximately stoichiometrical proportions.

JACK THEO THURSTON.